US009881533B2

(12) United States Patent
Li et al.

(10) Patent No.: US 9,881,533 B2
(45) Date of Patent: Jan. 30, 2018

(54) METHOD FOR DETECTING BRIGHT SPOT OF LIQUID CRYSTAL DISPLAY PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jia Li, Beijing (CN); Zhilong Peng, Beijing (CN); Qingzeng Shan, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 227 days.

(21) Appl. No.: 14/403,705

(22) PCT Filed: Dec. 5, 2013

(86) PCT No.: PCT/CN2013/088661
§ 371 (c)(1),
(2) Date: Nov. 25, 2014

(87) PCT Pub. No.: WO2015/027604
PCT Pub. Date: Mar. 5, 2015

(65) Prior Publication Data

US 2015/0294608 A1 Oct. 15, 2015

(30) Foreign Application Priority Data

Aug. 27, 2013 (CN) .......................... 2013 1 0378441

(51) Int. Cl.
*G02F 1/133* (2006.01)
*G09G 3/00* (2006.01)
*G09G 3/36* (2006.01)

(52) U.S. Cl.
CPC ........... *G09G 3/006* (2013.01); *G09G 3/3648* (2013.01)

(58) Field of Classification Search
CPC ............... G06Q 30/02; G06Q 30/0257; G06Q 30/0269; G06Q 30/0267; G06Q 30/0277;
(Continued)

(56) References Cited

U.S. PATENT DOCUMENTS 7,847,914 B2 12/2010 Kim et al.
2003/0122767 A1 7/2003 Nakao et al.
(Continued)

FOREIGN PATENT DOCUMENTS

CN 101661169 A 3/2010
CN 101819337 A 9/2010
(Continued)

OTHER PUBLICATIONS

Notification of the First Office Action dated Jun. 9, 2015 corresponding to Chinese application No. 201310378441.0.
(Continued)

*Primary Examiner* — Alesa Allgood
(74) *Attorney, Agent, or Firm* — Nath, Goldberg & Meyer; Joshua B. Goldberg; Tanya E. Harkins

(57) ABSTRACT

Embodiments of the present invention disclose a method for detecting a bright spot of a liquid crystal display panel, which belongs to the field of display. The method can solve a technical problem of miss detecting by the bright spot detection method in the prior art which o can not detect a bright spot caused by the short circuit between a data line and a pixel electrode. The method for detecting a bright spot
(Continued)

of a liquid crystal display panel comprises: scanning gate lines of the liquid crystal display panel, and simultaneously outputting low level signals by data lines of the liquid crystal display panel; and, stopping the scanning of the gate lines of the liquid crystal display panel, and simultaneously outputting high level signals by the data lines. The method may be used for detecting liquid crystal display panels of ADS type.

8 Claims, 2 Drawing Sheets

(58) Field of Classification Search
CPC .. G06Q 50/01; G06Q 30/0241; G08G 5/0021; H04N 21/812; G06F 3/04842; G06F 17/211
See application file for complete search history.

(56) References Cited

U.S. PATENT DOCUMENTS

2005/0168491 A1* 8/2005 Takahara ............... G09G 3/006 345/690
2012/0086743 A1* 4/2012 Shiomi ............. G02F 1/136213 345/694
2014/0104526 A1* 4/2014 Shan ................... G02F 1/13306 349/42
2015/0049274 A1* 2/2015 Kim ..................... G09G 3/3614 349/41

FOREIGN PATENT DOCUMENTS

| | | | | |
|---|---|---|---|---|
| CN | 102931189 A | | 2/2013 | |
| JP | 2007140130 | * | 6/2007 | ............... G02F 1/13 |
| JP | 2007140130 A | | 6/2007 | |
| JP | 2009128552 A | | 6/2009 | |
| JP | 2009216621 A | | 9/2009 | |

OTHER PUBLICATIONS

Written Opinion of the International Searching Authority dated Jun. 23, 2014 corresponding to International application No. PCT/CN2013/088661.
Search Report issued in International Application No. PCT/CN2013/088661, eleven (11) pages.

* cited by examiner

METHOD FOR DETECTING BRIGHT SPOT OF LIQUID CRYSTAL DISPLAY PANEL

This is a National Phase Application filed under 35 U.S.C. 371 as a national stage of PCT/CN2013/088661, filed Dec. 5, 2013, and claims priority benefit from Chinese Application No. 201310378441.0, filed Aug. 27, 2013, the content of each of which is hereby incorporated by reference in its entirety.

FIELD OF THE INVENTION

The present invention belongs to the field of display, and particularly relates to a method for detecting a bright spot of a liquid crystal display panel.

BACKGROUND OF THE INVENTION

With the continuous development of the display technology, due to the advantages of small size, low power consumption, no radiation and the like, Thin Film Transistor Liquid Crystal Displays (TFT-LCD, for short) dominate in the panel display field. After a liquid crystal display panel is well manufactured, it is required to perform quality inspection, and among others, bright spot detection is an important one of the quality inspection items.

An existing method for detecting a bright spot of a liquid crystal display panel is as follows: cyclically scanning gate lines of the liquid crystal display panel, and simultaneously outputting low level signals by data lines. Under normal circumstances, the liquid crystal display panel will display a black image. If a TFT of a certain pixel breaks down, for example, a pixel electrode is in short circuit with a gate, a high level signal will be input to the pixel electrode and the corresponding pixel will be displayed as a bright spot. In this way, the bright spot is detected.

During the implementation of the present invention, the inventor(s) found that there are at least the following problems in the prior art. As shown in FIG. 1, many bright spot defects at present are mostly caused by the fact that a pixel electrode 2 is in short circuit with a data line 3 due to the presence of foreign matters 1 (or film layer residuals) in a pixel region and is thus out of control of a TFT 4. For example, for an Advanced super Dimension Switch (ADS, for short) type liquid crystal display panel, particularly in the case that its driving mode is a row inversion driving mode of which the Gate driver On Array (GOA, for short) technology is representative, the above problem is particularly acute. Specifically, by using the existing method for detecting a bright spot of a liquid crystal display panel, if the data line 3 outputs a low level signal at the same time of scanning gate lines 5, the low level signal will be input to the pixel electrode on the liquid crystal display panel, wherein the low level signal will also be input to the pixel electrode 2 in short circuit with the data line 3, so that the pixel where the pixel electrode 2 in short circuit with the data line 3 is located will not be displayed as a bright spot. Therefore, the existing method for detecting a bright spot of a liquid crystal display panel can not detect a bright spot caused by the short circuit of a pixel electrode with a data line and is likely to result in missed detection in the bright spot detection process.

SUMMARY OF THE INVENTION

Embodiments of the present invention provide a method for detecting a bright spot of a liquid crystal display panel, which can detect a bright spot caused by the short circuit between a data line and a pixel electrode, such that the technical problem of miss detecting by the bright spot detection method in the prior art can be solved.

To achieve the above objective, the embodiments of the present invention implement the following technical solutions.

The present invention provides a method for detecting a bright spot of a liquid crystal display panel, including:

scanning gate lines of the liquid crystal display panel, and simultaneously outputting low level signals by data lines of the liquid crystal display panel; and stopping the scanning of the gate lines, and simultaneously outputting high level signals by the data lines.

Scanning the gate lines of the liquid crystal display panel is specifically as follows:

progressively scanning the gate lines of the liquid crystal display panel.

Scanning the gate lines of the liquid crystal display panel may include: scanning part of the gate lines of the liquid crystal display panel.

Preferably, the liquid crystal display panel is an advanced super dimension switch liquid crystal display panel.

Preferably, a gate driving circuit of the liquid crystal display panel employs a gate driver on array mode.

Preferably, the low level signal corresponds to the lowest gray scale of the liquid crystal display panel.

Preferably, the high level signal corresponds to the highest gray scale of the liquid crystal display panel.

Compared with the prior art, the technical solutions provided by the present invention have the following advantages: in the method for detecting a bright spot of a liquid crystal display panel provided by the present invention, the gate lines of the liquid crystal display panel are scanned first, and simultaneously the low level signals are output by the data lines. As the low level signals are input to each row of scanned pixel electrodes by the data lines, pixels where these pixel electrodes are located displays a black image. Then, the gate lines of the liquid crystal display panel are closed, that is, the scanning of the gate lines is stopped, and simultaneously high level signals are output by the data lines. Under normal circumstances, as the gate lines are closed, the high level signals on the data lines will not be input to the pixel electrodes, so that the black image remains. If a certain pixel electrode is short-circuited with a data line, then the pixel electrode would not be controlled by the TFT, and the high level signal on the data line would be input to the pixel electrode, so as to form a intensive electric field between the pixel electrode and a common electrode, causing liquid crystal molecules deflected. Thus, the pixel where the pixel electrode is located will display a bright spot in the black image. In this way, the bright spot caused by the short circuit between the data line and the pixel electrode may be detected, and the technical problem of miss detecting by the bright spot detection method in the prior art can be solved.

BRIEF DESCRIPTION OF THE DRAWINGS

To describe the technical solutions in the embodiments of the present invention more clearly, the drawings for illustrating the embodiments will be briefly described as below.

DETAILED DESCRIPTION OF THE EMBODIMENTS

The technical solutions in the embodiments of the present invention will be described clearly and completely as below with reference to the drawings of the embodiments of the present invention. It should be understood that the following proposed exemplary embodiments are used for making those skilled in the art understand and implement the present invention more easily, but are not intended to limit the scope of the present invention within the following illustrated specific exemplary embodiments.

Embodiment 1

The method for detecting a bright spot of a liquid crystal display panel provided by this embodiment is described by taking the detection for an ADS type liquid crystal display panel as an example, and the liquid crystal display panel employs a gate driving circuit based on GOA technology. The method for detecting a bright spot of a liquid crystal display panel includes the following steps:

Step S1: Scan gate lines of the liquid crystal display panel, and simultaneously output low level signals by data lines of the liquid crystal display panel.

Figure 1:
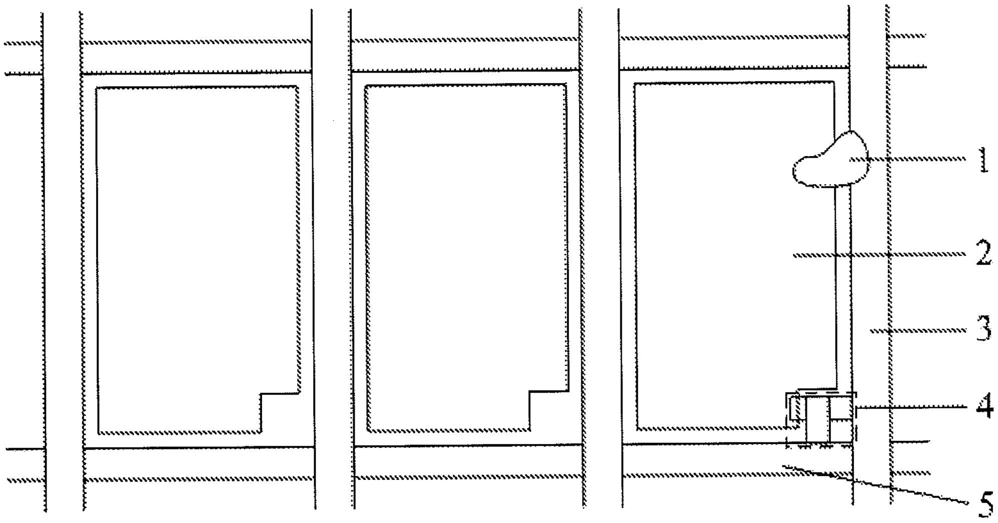
PRIOR ART FIG. 1
FIG. 1 is a schematic diagram illustrating that a bright spot is caused by the short circuit between a pixel electrode and a data line.
Figure 2:
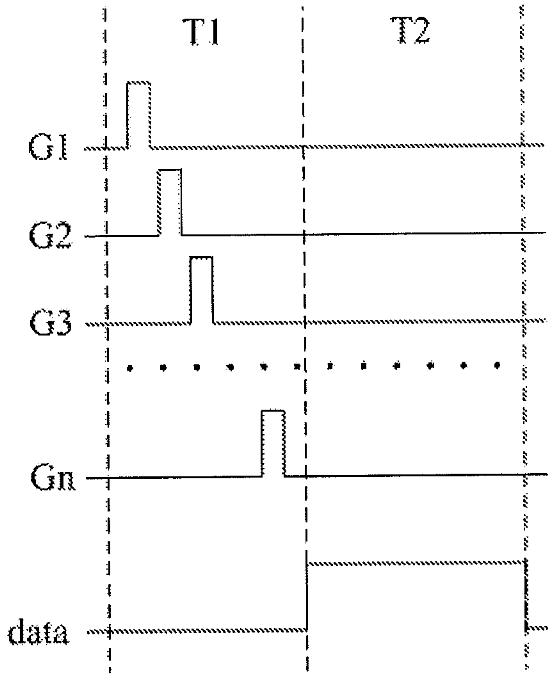
FIG. 2 is a signal timing diagram of a method for detecting a bright spot of a liquid crystal display panel provided by an embodiment of the present invention.

Specifically, as shown in FIG. 2, within a time period T1, in a GOA mode, all the gate lines of the liquid crystal display panel are scanned progressively, that is, a high level signal is applied to gate lines (G1-Gn) in sequence, and simultaneously the data lines (data) of the liquid crystal display panel output low level signals. As the low level signals are input to each row of pixel electrodes by the data lines (data), the liquid crystal display panel displays a black image. Preferably, the low level signal output by the data line (data) may be 0V, that is, there is no output signal. Alternatively, the low level signal may be an output signal equal to the voltage (about 0.2V) of a common electrode so as to correspond to the lowest gray scale of the liquid crystal display panel.

In other implementations, all the gate lines may be grouped. Each group may include one or more rows of gate lines, and only one group of gate lines are scanned each time, that is, part of the gate lines of the liquid crystal display panel are scanned progressively once. If the gate lines are scanned in group, it means that the liquid crystal display panel is divided into several corresponding parts, the bright spot detection is performed in batches, with each batch detecting bright spots for the part corresponding to one group of gate lines.

It should be noted that the method for detecting a bright spot of a liquid crystal display panel provided by this embodiment of the present invention is mainly used for detecting a bright spot caused by the short circuit between a pixel electrode and a data line. However, if there is a short circuit between a pixel electrode and a gate in the liquid crystal display panel, the pixel electrode being short-circuited with the gate will be displayed as a bright spot after the step S1 due to the input of a high level signal thereto. In this way, the bright spot is detected.

Step S2: Stop the scanning of the gate lines of the liquid crystal display panel, and simultaneously output high level signals by the data lines.

Specifically, as shown in FIG. 2, within a time period T2, a cut-off voltage (usually, −8V) is applied to the gate, the gate lines (G1-Gn) of the liquid crystal display panel are closed, and simultaneously, the data lines (data) output high level signals. Preferably, the high level signal output by the data line corresponds to the highest gray scale of the liquid crystal display panel. In this way, the displayed bright spot is significantly obvious in comparison with the previously formed black image and thus easily to be identified.

Figure 3:
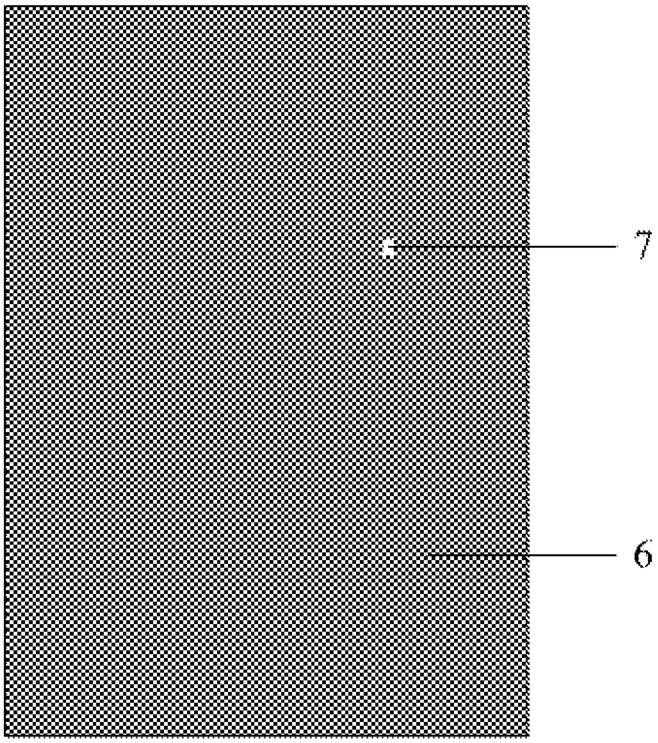
FIG. 3 is an effect diagram of detection of a bright spot by the method for detecting a bright spot in the embodiment of the present invention.

Under normal circumstances, as the gate lines are closed, the high level signal on the data line will not be input to pixel electrode, and the liquid crystal display panel will continue to display the black image. However, if a certain pixel electrode is short-circuited with a data line, then the pixel electrode would not be controlled by the TFT, and the high level signal on the data line would be input to the pixel electrode, so as to form a intensive electric field between the pixel electrode and a common electrode, causing liquid crystal molecules deflected. As shown in FIG. 3, the pixel where the pixel electrode is located will display a bright spot 7 in the black image 6. In this way, the bright spot caused by the short circuit between the data line and the pixel electrode may be detected, and the technical problem of miss detecting by the bright spot detection method in the prior art can be solved.

By the method for detecting a bright spot of a liquid crystal display panel provided by the embodiment of the present invention, unqualified products can be intercepted during the bright spot detection, and the unqualified products having bright spots are prevented from entering the subsequent module process, so that the waste of manpower and material resource costs in the module process is reduced, and the tension in detecting during the module process is also lowered.

Embodiment 2

The ADS type liquid crystal display panel utilizing the method for detecting a bright spot of a liquid crystal display panel of this embodiment employs a gate driving circuit in the form of an Integrated Circuit (IC, for short), rather than a gate driving circuit based on GOA technology.

The method for detecting a bright spot of a liquid crystal display panel in this embodiment is substantially the same as Embodiment 1, with a difference that it is not required to progressively scan the gate lines in the step S1 in this embodiment, and only two times of scanning is enough, that is, all gate lines in odd rows in the liquid crystal display panel are scanned at the first time and all gate lines in even rows in the liquid crystal display panel are scanned at the second time, and simultaneously the data lines output low level signals. In this way, the liquid crystal display panel may display a black image.

The step S2 in this embodiment is the same as the step S2 in Embodiment 1. That is, the scanning of the gate lines of the liquid crystal display panel is stopped and simultaneously high level signals are output by the data lines. Thus, as the high level signal is only input to a pixel electrode which is short-circuited with a data line, the pixel where the pixel electrode is located will display a bright spot in the black image. In this way, the bright spot caused by the short circuit between the data line and the pixel electrode may be detected.

It should be noted that the method for detecting a bright spot of a liquid crystal display panel provided by Embodiment 1 and Embodiment 2 of the present invention is used for detecting not only ADS type liquid crystal display panels but also liquid crystal display panels of Twisted Nematic (TN, for short) type and other types.

The foregoing description merely shows specific implementations of the present invention, and the protection scope of the present invention is not limited thereto. Any variation or substitution readily conceived by any skilled one who is familiar with this art within the disclosed technical scope of the present invention shall be included in the protection scope of the present invention. Therefore, the protection scope of the present invention should be determined by the protection scope of the claims.

The invention claimed is:

1. A method for detecting a bright spot of a liquid crystal display panel, characterized in that the method comprises:

scanning gate lines of the liquid crystal display panel, and simultaneously applying low level signals via data lines of the liquid crystal display panel; and stopping the scanning of the gate lines of the liquid crystal display panel, and simultaneously applying high level signals via the data lines, wherein, throughout a period of applying the high level signals via the data lines, a cut-off voltage is applied to all the gate lines of the liquid crystal display panel thereby stopping the scanning of the gate lines of the liquid crystal display panel.

2. The method for detecting a bright spot of the liquid crystal display panel according to claim 1, characterized in that a gate driving circuit of the liquid crystal display panel employs a gate driver on array mode.

3. The method for detecting a bright spot of the liquid crystal display panel according to claim 1, characterized in that the low level signal corresponds to the lowest gray scale of the liquid crystal display panel.

4. The method for detecting a bright spot of the liquid crystal display panel according to claim 1, characterized in that the high level signal corresponds to the highest gray scale of the liquid crystal display panel.

5. The method for detecting a bright spot of the liquid crystal display panel according to claim 1, characterized in that scanning the gate lines of the liquid crystal display panel is specifically as follows:

progressively scanning the gate lines of the liquid crystal display panel.

6. The method for detecting a bright spot of the liquid crystal display panel according to claim 5, characterized in that a gate driving circuit of the liquid crystal display panel employs a gate driver on array mode.

7. The method for detecting a bright spot of the liquid crystal display panel according to claim 1, characterized in that scanning the gate lines of the liquid crystal display panel comprises: scanning part of the gate lines of the liquid crystal display panel.

8. The method for detecting a bright spot of the liquid crystal display panel according to claim 7, characterized in that a gate driving circuit of the liquid crystal display panel employs a gate driver on array mode.

* * * * *